Sept. 21, 1937.　　　　B. VON PENTZ　　　　2,093,877
FILTER CARTRIDGE
Filed Jan. 28, 1937
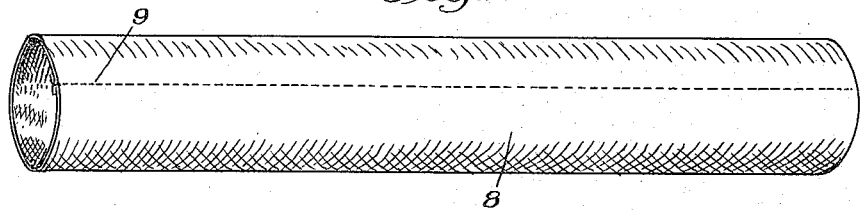
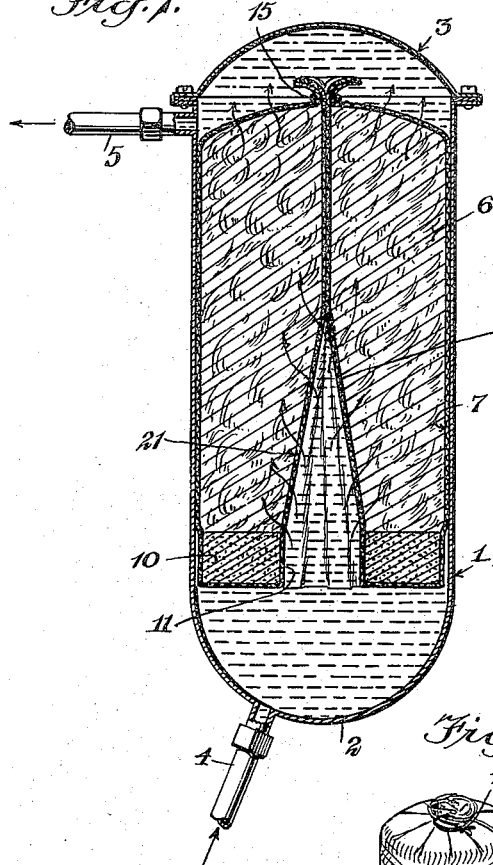
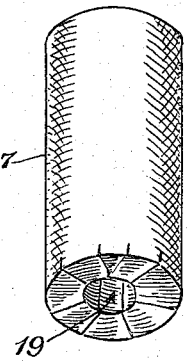
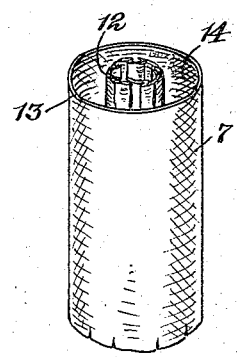
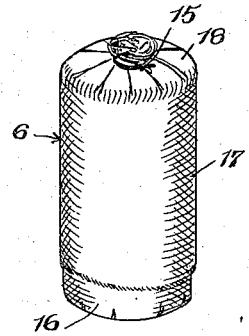
WITNESSES
INVENTOR
Benjamin Von Pentz
BY
Munn, Anderson & Liddy
ATTORNEYS Patented Sept. 21, 1937

2,093,877

UNITED STATES PATENT OFFICE 2,093,877

FILTER CARTRIDGE

Benjamin Von Pentz, New York, N. Y.

Application January 28, 1937, Serial No. 122,696

2 Claims. (Cl. 210—131)

The present invention relates to filters for lubricating oil and more particularly to an oil filter for use in the lubricating system usually found in motor cars and generally disposed between the source of supply of the lubricating oil and the casing of the engine and intended to remove the impurities contained in the oil as it passes from the oil tank to the engine.

More particularly the invention relates to a cartridge or filler so formed that it can be readily inserted and removed from the filter case and when inserted having close contact with the inner face of the wall of the filter chamber between the inlet and outlet thereof, so that the lubricating oil forced therethrough by pressure will be required to pass through the filter cartridge to remove from the oil acids and other impurities which are liable to damage the engine and its casing.

To the above ends the present invention consists of the filter cartridge and the devices and combinations of devices as hereinafter described and claimed.

The present invention is shown in the accompanying drawing in which—

Fig. 1 shows a longitudinal sectional view through a usual form of filter chamber with my improved filter cartridge inserted therein;

Fig. 2 is a side elevation of a tube from which the cartridge casing is formed;

Fig. 3 is a perspective view of the cartridge tilted so as to show the lower end thereof;

Fig. 4 is a perspective view of the cartridge casing tilted to show the upper end thereof and before the ends of the inner and outer members are secured to confine the filtering elements contained therein;

Fig. 5 shows a perspective view of the completed cartridge, tilted to show the upper end thereof.

Similar reference characters will be employed to designate corresponding parts.

In the drawing I indicates the case or shell of an oil filter for automobiles of common form. The case or shell I is usually made of metal and has a convex end 2 and is closed at the opposite end by a removable circular cover 3 which is also convex. The case or shell I is cylindrical in cross section and is provided with an inlet 4 and an outlet 5, the lubricating oil being forced under pressure into the case I through the inlet 4 through the filtering devices within the case I and discharged from the outlet 5 to the engine case (not shown). Within the case I is positioned the filter cartridge 6 (Fig. 5), the subject of the present application.

As shown the cartridge 6 comprises a textile casing 7 which in the form shown in the drawing is formed of an elongated tube 8 made of some suitable woven or knit material, the longitudinal edges of which are closed by a seam 9. A porous plate 10 in the form of a ring of molded and compressed fuller's earth, or other suitable clay product, is placed within the tubing 8 and one end of the tubing is gathered and passed through the opening 11 in the ring 10 and drawn upward (as shown in Fig. 4) forming a pleated or gathered inner tube 12, the end of which will be positioned centrally of and coincident to the opposite end 13 of the tube, thus providing a chamber 14 above the ring 10 into which is placed a fibrous filtering medium 15, preferably cotton waste, which is tightly packed therein to fill the cubical area of the space 14 between the inner and outer walls of the casing 7. The casing 7 is closed about the filtering mediums by bringing the ends 12 and 13 together at the center of the top and tying them together by a cord or wire 15 thus producing the complete cartridge 6 as shown in Fig. 5.

As indicated in Fig. 5, the cartridge 6 is cylindrical in cross section and somewhat reduced in diameter at the lower end 16 where the porous ring is located, as compared with the diameter at 17 above where the fibrous packing is located, and as indicated in Fig. 5, the upper end 13 of the outer casing is drawn tightly over the contents as indicated at 18. Preferably the diameter of the portion 17 of the cartridge will be such that while it may be readily inserted in the case I the portion 17 of the cartridge composed of the fibrous packing will yieldingly fit closely against the inner face of the chamber or case I with the porous ring 10 at the lower end or at the end adjacent the oil inlet 4.

It will be observed that the application of the textile casing 8 to enclose the filtering mediums when the disk 10 is in the form of a ring will produce at the lower end of the cartridge an opening 19, the wall of which gradually tapers from the lower end towards the upper end as indicated at 21.

It will be further noted that in the construction shown in the drawing the textile casing surrounds and encloses the filtering mediums from a central point approximating the axis thereof to the outer circumference.

In operation the filter cartridge being inserted in the chamber I of the filter as shown in Fig.

1 of the drawing, the oil forced through the inlet 4 must pass through the filtering cartridge before it can pass from the outlet 5 and thus all impurities and foreign matter removed, the acids being removed by the fuller's earth or other suitable clay product and particles of dirt by the cotton waste.

The cartridge can be placed in position by simply removing the cover 13 and pressing it into the chamber where it will be frictionally held, after which the cover 13 may be replaced; and this can be done by the owner of the car or others without requiring the services of a skilled mechanic.

I claim:

1. A filter cartridge comprising a tubular textile casing, a circular porous ring positioned therein at a point substantially midway between the ends of the casing, said ring having a central opening, the tubular casing doubled upon itself and passed upwardly through the central opening, and into the opposite end, a fibrous packing enclosed within the casing between the inturned ring and the outer part thereof above the filtering ring, the outer part of the casing surrounding the ring and packing, and the upper ends of both parts of the casing gathered and united to each other to close the casing above the contents thereof.

2. A filter cartridge such as defined in claim 1, in which the filtering plate is made of fuller's earth, and constitutes the base of the cartridge.

BENJAMIN VON PENTZ.